United States Patent [19]
Brocard et al.

[11] Patent Number: 5,803,433
[45] Date of Patent: Sep. 8, 1998

[54] DEVICE FOR ORIENTING SPRING FORCES ON RELATIVELY MOVABLE ELEMENTS

[75] Inventors: Jean-Marie Brocard, Rubelles; Christian Lacour, Vanves; Michel Marie André Albert Lechevalier, Bombon, all of France

[73] Assignee: Societe Nationale d'Etude et de Construction de Moteurs d'Aviation "S.N.E.C.M.A.", Paris, France

[21] Appl. No.: 821,335

[22] Filed: Mar. 20, 1997

[30] Foreign Application Priority Data

Mar. 28, 1996 [FR] France .................................. 96 03855

[51] Int. Cl.$^6$ .................................................. F16K 31/00
[52] U.S. Cl. .............................................................. 251/337
[58] Field of Search ............................................... 251/337

[56] References Cited

U.S. PATENT DOCUMENTS 5,285,813  2/1994  Quante et al. ........................... 251/337

FOREIGN PATENT DOCUMENTS

| 015 118 | 9/1980 | European Pat. Off. . |
| 128 749 | 12/1984 | European Pat. Off. . |
| 1150075 | 1/1958 | France . |
| 1 212 789 | 3/1966 | Germany . |

Primary Examiner—A. Michael Chambers
Attorney, Agent, or Firm—Bacon & Thomas

[57] ABSTRACT

An apparatus for orienting the forces exerted by a helical coil spring on relatively movable elements is disclosed in which a movable element is movably mounted within a casing so as to move along a movement axis, in which a helical coil spring is interposed between the casing and the movable element so as to exert opposite forces on the casing and the movable element. The lateral forces and the torque forces on the movable element are eliminated by using a swivel joint interposed between the piston and one end of the helical coil spring. The use of the swivel element insures that the force exerted on the movable element by the helical coil spring is coincident with the movement axis of the movable element. A second swivel joint may be utilized between the second end of the helical coil spring and the casing, if desired.

10 Claims, 3 Drawing Sheets

DEVICE FOR ORIENTING SPRING FORCES ON RELATIVELY MOVABLE ELEMENTS

BACKGROUND OF THE INVENTION

The present invention relates to an apparatus for orienting the forces exerted by a helical spring on relatively movable elements such that the resultant of the spring forces passes along the axis of movement of the movable elements, thereby eliminating any lateral forces being exerted on the elements.

The apparatus according to the present invention finds particular application in orienting the forces exerted on a piston by a helical spring wherein the piston is slidably movable in a casing. Such assemblies are widely used in fluid regulating, or hydro mechanical computing systems, in particular fuel regulating and fuel feed systems for aircraft gas turbine engines.

The surfaces of the piston and the casing wall defining a chamber in which the piston is slidably movable have high quality surface finishes to preclude any binding between the elements and to minimize friction between the movable elements as much as possible. The operational clearances between the casing and the piston are minute, being on the order of a few microns. It is important to assure accurate regulation of the fuel that no binding occurs between the piston and the casing during the movement of the piston.

However, as shown in FIGS. 1 and 2, in the known devices, the resultant force R exerted by the helical coil spring 1 on the piston 2 and the casing 3 does not pass through the center O of the corresponding support surface and is not oriented perpendicularly to the spring support surfaces. This is caused by the end turns of the helical coil spring resting on washers on the piston and casing surfaces perpendicular to the displacement or movement axis 5 of the piston 2. Manufacturing tolerances and spring deformations cause non-uniform force distribution on the washers.

Lateral force components F1, F2 act on the case and the piston, as does a torque C due to the resultant force R acting at an offset e between the movement axis 5 and the point at which the force R is applied to the piston surface. The force F1 and the torque C urge the piston 2 against the wall of the casing 3, thereby increasing the friction between these movable components, which may be particularly significant aboard an aircraft in flight.

SUMMARY OF THE INVENTION

An apparatus for orienting the forces exerted by a helical coil spring on relatively movable elements is disclosed in which a movable element is movably mounted within a casing so as to move along a movement axis, in which a helical coil spring is interposed between the casing and the movable element so as to exert opposite forces on the casing and the movable element. The lateral forces and the torque forces on the movable element are eliminated by using a swivel joint interposed between the movable element and one end of the helical coil spring. The use of the swivel element insures that the force exerted on the movable element by the helical coil spring is coincident with the movement axis of the movable element.

A second swivel joint may be utilized between the second end of the helical coil spring and the casing, if desired. In the ideal case, the contact reactions over the spherical surface portions of the swivel joint will always be perpendicular to a tangent to the spherical contact surface of the swivel joint and will be identical in magnitude. Accordingly, the reaction forces along the spherical swivel joint element all pass through the center of the sphere, which is aligned with the movement axis of the moveable element, thereby generating zero torque at this center.

Assuming that the swivel joint has a certain magnitude of friction between the relatively movable elements of the swivel joint, it may transmit a torque other than zero. However, the advantage of the instant invention lies in the ability to control the maximum torque by selecting a swivel joint with the least possible radius in relation to the particular criteria for each particular application. The maximum value of the torque C is defined by C=frR, wherein f is the coefficient of friction between the movable swivel joint elements, r is the radius of the hemispherical bearing surface of the swivel joint and R is the magnitude of the force.

Advantageously, the helical spring rests on a spherical swivel joint and pivots at both of its opposite ends, thereby allowing complete cancellation of any lateral forces. If only one swivel joint is utilized, the magnitude of the lateral force F1 depends upon the perpendicularity of the opposite spring support surface.

DETAILED DESCRIPTION OF THE PREFERRED EMBODIMENTS

Figure 1:
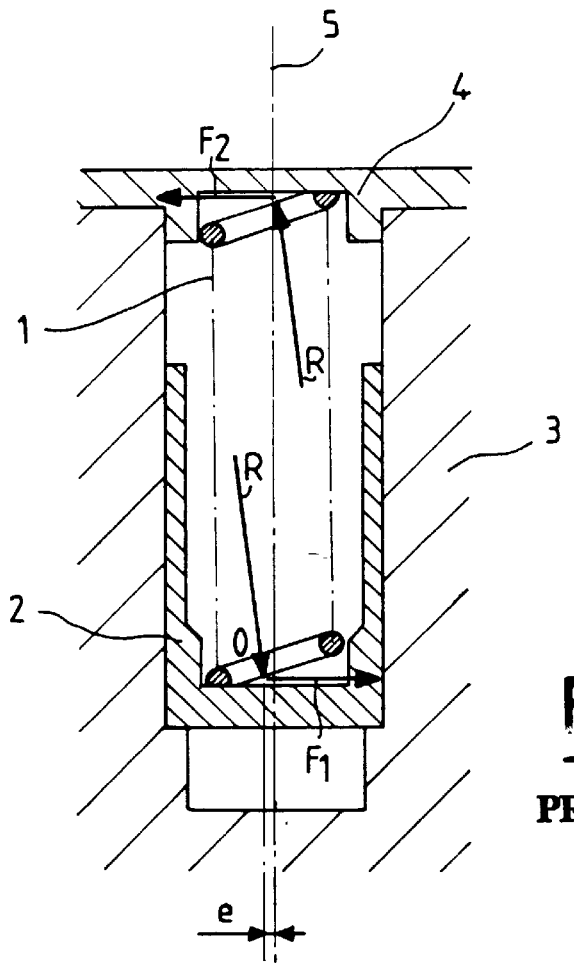
FIG. 1 is a cross-sectional view of a known slidable piston assembly with a helical spring interposed between the casing and the piston.
Figure 2:
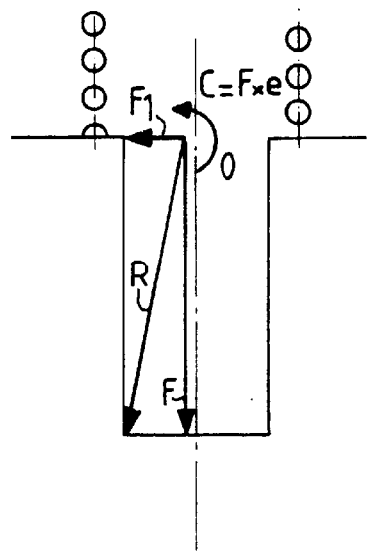
FIG. 2 is a force diagram of the forces acting on the support surfaces of the device illustrated in FIG. 1.
Figure 3:
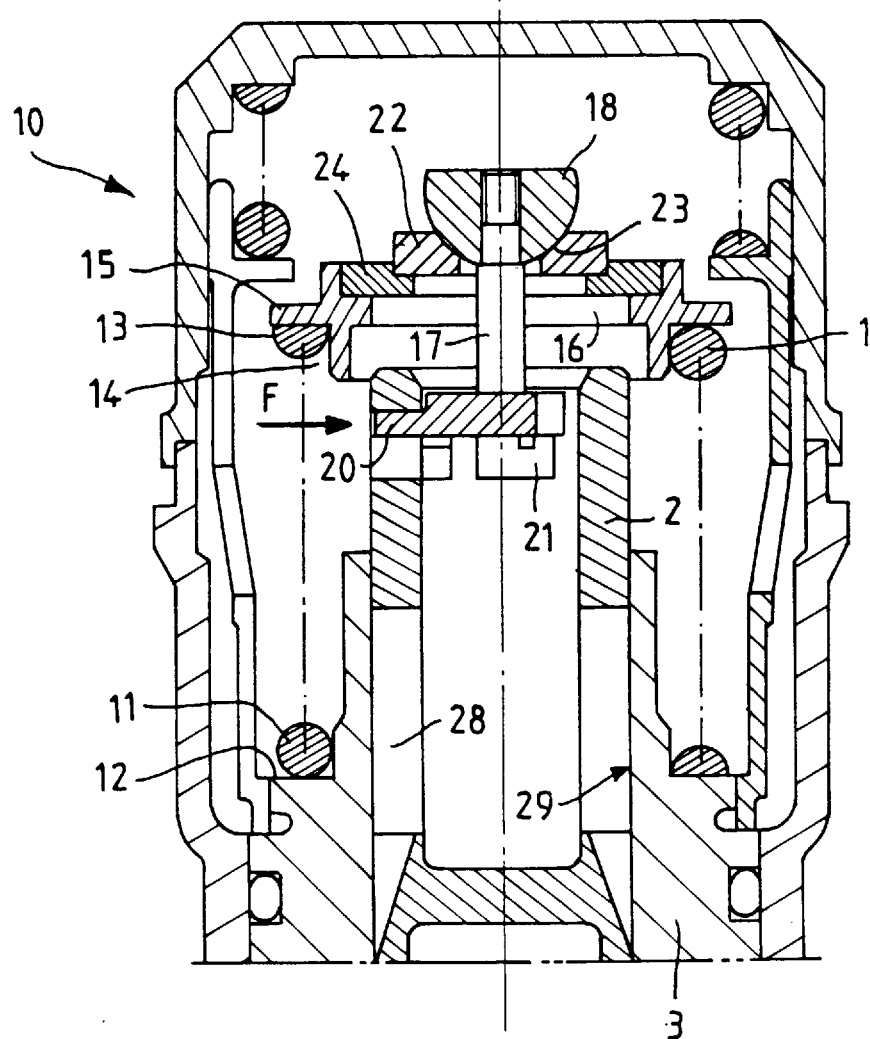
FIG. 3 is a cross-sectional view of the apparatus according to the invention with a swivel joint interposed between the piston and the end of the coil spring.
Figure 4:
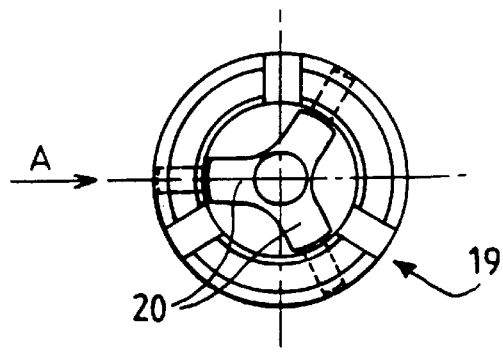
FIG. 4 is a top view of the piston illustrated in FIG. 3.
Figure 5:
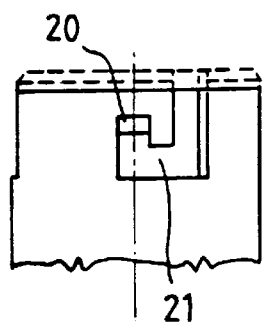
FIG. 5 is a partial, side view of the piston end as viewed in the direction of arrow A in FIG. 4.

FIGS. 1 and 2 illustrate a conventional assembly wherein a spring 1 is interposed between a casing 3 and a movable piston 2. Plate 4, which is rigidly attached to the casing 3 acts as a spring seat for one end of the coil spring 1, while the other end of the coil spring 1 acts on a surface of the piston 2. The resultant R of the forces exerted by the spring 1 on the support surface of the piston 2 is offset by a distance e from the center O of the spring support surface. As can be seen, the resultant R does not act perpendicularly to the support surface and can be resolved into a lateral force F1 and a force F acting parallel to the movement axis 5 of the piston 2. A torque, C=Fe is applied at the center O and tends to tip the piston 2 within the bore of the casing 3. These forces increase the friction between the piston 2 and the casing 3, which is undesirable in a fuel feed/regulating system.

FIGS. 3–7 illustrate a hydraulic fluid feed system 10 comprising a casing 3 and a piston 2 slidably mounted within the casing 3. A helical spring 1 is inserted between the casing 3 and the piston 2 in order to regulate the sizes of the fluid transmitting apertures as a function of the fluid pressure. As clearly shown in FIG. 3, the lower end turn 11 of helical spring 1 rests on a circumferential annular shoulder 12 formed on the casing 3, whereas the upper end turn 13 is located within a channel 14 formed on washer 15.

The washer 15 forms a central aperture 16 through which passes rod 17 coaxial with the movement axis of the piston 2 and fastened at its upper end to a generally hemispherical male swivel member 18 and at its lower end an attachment 19 (see FIG. 4) affixing the rod 17 to the piston 2. The attachment 19 comprises a plurality, in this particular instance three, diverging arms 20 extending from the rod 17 located equidistantly around the axis of the rod 17 and extending in a plane generally perpendicular to this axis. The arms 20 enter and lock into the piston via 3 recesses 21 formed in the piston wall (see FIG. 5).

A swivel ring 22 is interposed between the washer 15 and the swivel element 18, the swivel ring 22 having a concave spherical surface 23 bearing against the convex spherical surface of the swivel member 18. A keyed shim 24 is inserted between the swivel ring 22 and the washer 15. The shim 24 is generally annular in configuration and has a notch 25 extending through one side to enable the shim to be laterally slid in place around the rod 17. The shim 24 is centered by a seat formed on the upper surface of washer 15. The male swivel member 18 is fastened to the rod 17 by screw 26 and lock washer 27 (See FIGS. 6 and 7). The magnitude of the force exerted on the swivel joint by the spring 1 depends upon the thickness of the shim 24. Shim 24 may be easily removed and replaced with a shim having a different thickness to adjust the force exerted on the swivel joint by compressing the spring 1 and removing the shim 24 laterally. Installation of another shim is made by sliding the shim inwardly on top of the washer and releasing the compression of the spring 1.

The piston 2 slides in the casing 3 under the influence of the opposing forces from the spring 1 and the fluid pressure inside the fluid feed system 10 in order to regulate the magnitude of the apertures 28 in the wall of the piston 2 which are exposed inside the wall 29 of the casing 3.

Figure 6:
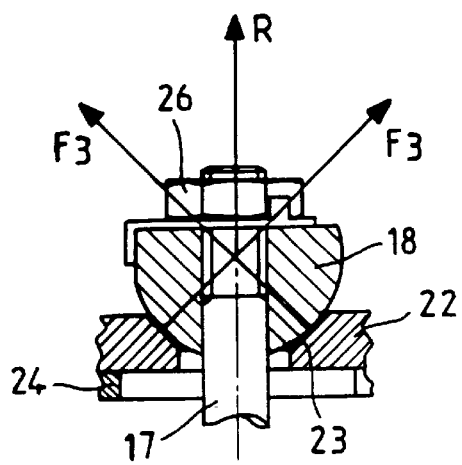
FIG. 6 is a partial, cross-sectional view of the swivel joint utilized in the present invention.
Figure 7:
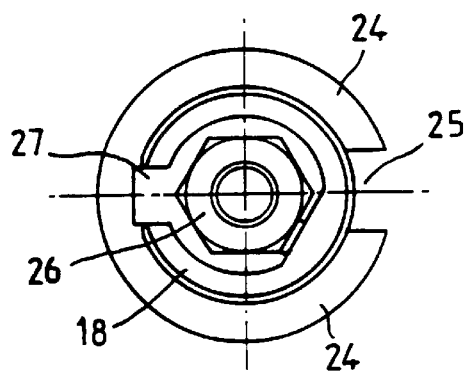
FIG. 7 is a top view of the swivel joint illustrated in FIG. 6.

As shown in FIG. 6, the force elements F3 exerted by the swivel ring 22 on the swivel member 18 are perpendicular to a tangent of the mating support surfaces and all pass through the center of the spherical swivel member 18 located on the axis of rod 17. Accordingly, the resultant R is centered on the axis of rod 17, which is coincident with the axis of movement of the piston 2.

The foregoing description is provided for illustrative purposes only and should not be construed as in anyway limiting this invention, the scope of which is defined solely by the appended claims.

We claim:

1. An apparatus for orienting the forces exerted by a helical spring on relatively movable elements, the apparatus comprising:
   a) a casing;
   b) an element movably located in the casing so as to move along a movement axis;
   c) a helical coil spring having a longitudinal axis coaxial with the movement axis, the helical coil spring having two opposite ends and located so as to exert opposite forces on the casing and the movable element;
   d) a swivel joint interposed between at least one of the two opposite ends of the helical coil spring and the movable element, such that the resultant of the forces exerted by the helical coil spring on the at least one of the casing and movable element is coincident with the movement axis, wherein the swivel joint comprises:
      i) a first swivel member having a first bearing surface and connected to the movable element;
      ii) a washer on one end of the helical coil spring;
      iii) a second swivel member located on the washer and having a second bearing surface movably bearing against the first bearing surface and,
      iv) a shim removably located between the washer and the second swivel member.

2. The apparatus of claim 1 wherein the swivel joint is interposed between the helical coil spring and the movable element.

3. The apparatus of claim 2 wherein the movable element comprises a piston.

4. The apparatus of claim 1 wherein the first bearing surface comprises a convex, generally spherical surface having a center located on the movement axis.

5. The apparatus of claim 4 wherein the second bearing surface comprises a concave surface.

6. The apparatus of claim 1 further comprising:
   a) a rod attached to the first swivel member; and,
   b) a plurality of arms extending from the rod and connected to the movable element.

7. An apparatus for orienting the forces exerted by a helical spring on relatively movable elements, the apparatus comprising:
   a) a casing;
   b) an element movably located in the casing so as to move along a movement axis;
   c) a helical coil spring having a longitudinal axis coaxial with the movement axis, the helical coil spring having two opposite ends and located so as to exert opposite forces on the casing and the movable element;
   d) a swivel joint interposed between one of the two opposite ends of the helical coil spring and the movable element, such that the resultant of the forces exerted by the helical coil spring on the at least one of the casing and movable element is coincident with the movement axis, wherein the swivel joint comprises:
      i) a first swivel member having a first bearing surface and connected to the movable element;
      ii) a washer on one end of the helical coil spring;
      iii) a second swivel member located on the washer and having a second bearing surface movably bearing against the first bearing surface;
      iv) a rod attached to the first swivel member; and,
      v) a plurality of arms extending from the rod and connected to the movable element.

8. The apparatus of claim 7 wherein the movable element comprises a piston.

9. The apparatus of claim 8 wherein the second bearing surface comprises a concave surface.

10. The apparatus of claim 7 wherein the first bearing surface comprises a convex, generally spherical surface having a center located on the movement axis.

* * * * *